United States Patent [19]

Yoshikawa et al.

[11] 3,915,779
[45] Oct. 28, 1975

[54] METHOD FOR EFFECTING VACUUM EVAPORATION

[75] Inventors: Shinsuke Yoshikawa; Tohru Sasaki; Syuji Terasaki, all of Iwaki, Japan

[73] Assignee: Kureha Kagaku Kogyo Kabushiki Kaisha, Tokyo, Japan

[22] Filed: July 10, 1974

[21] Appl. No.: 487,404

[30] Foreign Application Priority Data
July 10, 1973  Japan.............................. 48-77048

[52] U.S. Cl. ............... 156/229; 156/150; 156/247; 156/280; 156/344; 427/172; 427/251
[51] Int. Cl.² ................ B32B 31/08; B32B 31/12; B32B 33/00
[58] Field of Search ............ 117/7, 106, 107, 107.1; 156/229, 278, 150, 247, 280, 344; 264/284, 291, 292

[56] References Cited
UNITED STATES PATENTS
2,297,608  9/1942  Blackburn.......................... 156/580
3,326,177  6/1967  Taylor............................. 117/107.1
3,660,146  5/1972  Chadsey, Jr. et al. ........... 117/106 R Primary Examiner—William A. Powell
Assistant Examiner—Brian J. Leitten
Attorney, Agent, or Firm—Sughrue, Rothwell, Mion, Zinn & Macpeak

[57] ABSTRACT

A method for effecting vacuum evaporation onto extremely thin and whippy thermoplastic films. In the method, a laminated film is prepared consisting of a first layer of a film to be metallized and a second layer of a base film. The laminated film is subjected to elongation at least uniactially at a temperature below the melting points and above the second degree transition points of the materials of the two films. The laminated film thus elongated is then processed by conventional vacuum evaporation.

1 Claim, 2 Drawing Figures

FIG. 1
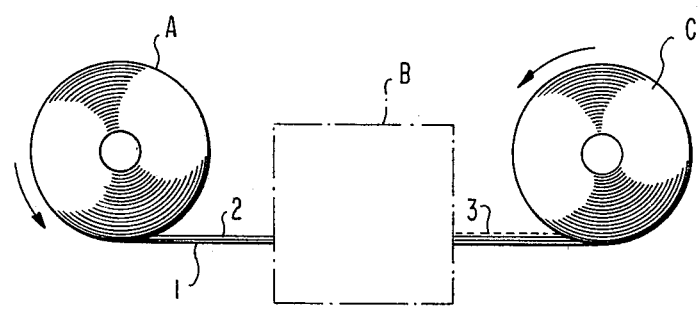
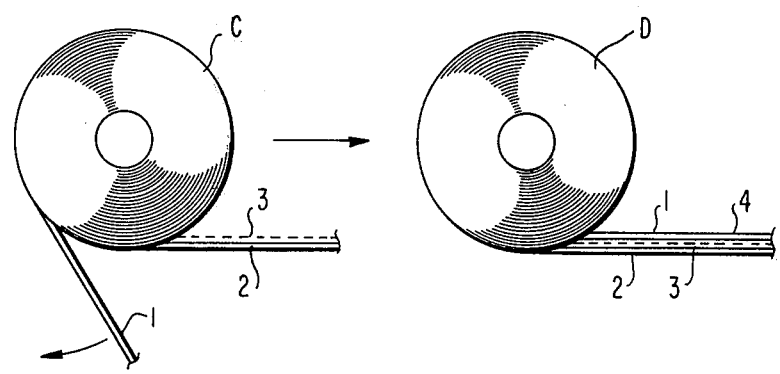
FIG. 2

METHOD FOR EFFECTING VACUUM EVAPORATION

BACKGROUND OF THE INVENTION

The present invention relates to a method for effecting vacuum evaporation on to one or both sides of thermoplastic films, and more particularly to a method for effecting vacuum evaporation onto extremely thin or whippy films which could harldy be treated by conventional vacuum evaporator of semicontinuous type.

Metallized films having metal layers formed by the vacuum evaporation are known to be applicable for various objects, for example, in the field of industry, to form dielectrics of metallized condenser or to form polymeric piezoelectric element, as well as for the purposes of decorations. In order to obtain small szied condensers, the thinner dielectric films are required. Also, the thinner the piezoelectric films are the more excellent sound-electric transducer or pressure pickup element becomes obtainable.

To carry out the vacuum evaporation method for extremely thin, say below 9 microns in thickness, films, one have been encountered by such a problem that wrinkles are tend to appear in the final metallized films. This is due to the deformation or the change in size of the film which is caused by the heat radiated from the metal evaporation source in the evaporation and by the heat generated during the condensation of the metal deposited onto the film.

Hitherto, in order to overcome above problem, atempts have been made to raise the cooling effect in the apparatus and to minimize the heat transferred from the evaporation source. Another solution for this problem which has been adopted up to now is to use a base or carrier film having enough stiffness and dimensional stability against the heat, which is laminated with the film to be subjected for the evaporation.

However, the former way of solution is short to effect industrially satisfactory production of metallized films with such thin films as being under 9 microns in thickness when they are of whippy materials such as polypropylene or polyvinylidene fluoride, and as being below 6 microns in thickness when they are of relatively stiff materials such as polyester.

It is almost impossible to effect vacuum evaporation in an industrial scale, onto both sides of such thin films.

The later way of solution is also inconvenient in that it is quite difficult to laminate an extremely thin film onto the base or carrier film without bringing wrinkles, and in that wrinkles are still tend to appear for an eventual delamination due to the difference of the coefficients of thermal expansion between the two films.

SUMMARY OF THE INVENTION

It is therefore a general object of the invention to provide a method according to which it becomes possible to adopt the vacuum evaporation for one or both sides of those extremely thin films.

According to the invention there is provided a method for effecting vacuum evaporation onto at least one surface of a film comprising the steps of forming a laminated film consisting of a first film which is to be treated and a second film of a thickness at least equal to the thickness of the first film and serving as a base film, said first and second films being not subjected to elongation prior to the lamination, elongating the laminated film in at least one direction at a temperature below the melting points and above the second order transition points of the materials of the films, and subjecting thus elongated laminated film to a vacuum evaporation to form a metal layer on the surface of the first film.

In the above method, it is required that the two unelongated films must be of polymeric materials so that they may be elongated concurrently. It is also required the elongated films assume as if they were unitary or adhered with each other, without involving air therebetween, without being distorted independently of each other which would cause separation, and without forming any wrinkes. Those requirements can conveniently be satisfied by suitably selecting the polymers, the ratio of thickness between the two films, or other components.

The laminated film of the present method can be obtained by simply laminating one sheet with the other sheet, when they are of the same polymer or of the same polymer material having different dispensations of stabilizers and/or plasticizers, or when they are of the polymer materials of the same kind in each of which the same polymer is blended. With such materials of the films as are insoluble with each other, it is preferred to directly extrude a laminated film from a die which is adapted to be supplied with polymer materials prepared in respective extruder, or to press the films extruded from respective extruder to each other to form the lamination.

the laminated film thus formed and then elongated are stiff enough of its thickness which amounts at least the twice of the single film to be treated. In addition the delamination or separation of the sheet due to the thermal distortion can hardly occur because two layers of the film have been elongated in the same rate and at the same temperature which produces similar dimensional stability of the two layers.

When it is desired to form the metal layer on both sides, the metallized layer is transferred to a second base film in such a manner that the surface having the metal layer contacts the second base film with the other, i.e. untreated, surface being exposed for subsequent metallizing treatment.

This transfer can conveniently carried out when the metallized film is wound into a roll, in which case the surface having the metal layer is in contact with the back side of the next turn of the base film which constitutes the second base film.

Namely, in this case, by unwiding the roll in such a manner that the metallized film is delaminated from the original base film and laminated at the metallized surface with the back side of the base film of the next turn, a new laminated film is obtained in which the metallized surface is in contact with the new or second base film whereas the other surface is exposed for the subsequent treatment.

It is true that the adhesion between the metallized surface and the second base film is not so strong as that between the untreated surface and the original base film, but it does not affect materially because the both films constituting the new laminated film have experienced heat treatment during the prior metallizing process so that much less shrinkage and almost no wrinkling occur in the subsequent vacuum evaporation process.

BRIEF DESCRIPTION OF DRAWINGS

Many other features, advantages and additional objects of the present invention will become manifest to those skilled in the art upon making reference to the detailed description of an embodiments which follows and the accompanying sheet of drawings, in which:

FIG. 1 is a schematic illustration showing a manner in which vacuum evaporation is effected onto one surface of a laminated film.

FIG. 2 is a schematic illustration showing a manner in which a metallized film is transferred to a new base film so that the untreated surface may be exposed for the subsequent metallizing process.

DETAILED DESCRIPTION OF THE INVENTION

Referring to FIG. 1, a long laminated film consisting of first film 2 to be metallized and a second film 1 which serves as a base film is wound in a roll "A". The laminated film has been subjected to an elongation process before they are wound into the roll "A". The two films are seemingly adhered to each other.

The laminated film is successively extracted from the roll "A" to be subjected to a vacuum evaporation or metallizing "B" during which a metal layer 3 is formed on the surface of the film 2. The laminated film thus metallized is then wound into another roll "C". It will be understood that at this stage the film 2 is metallized only at its one surface with the other surface untreated.

When it is desired to have the other surface of the film 2 be metallized, the film 2 which has already been metallized at its one surface is delaminated from the base film 1, as shown in FIG. 2, then the film constituting the outer layer, i.e., the base film 1, is unwound as represented by an arrow in FIG. 2, until the leading edge of the base film 1 makes one revolution around the roll "C". The unwound base film 1 is then layed over the metallized surface of the film 2, whereby a new laminated film is obtained, at a drawing point 4, consisting of a base film 1 and a metallized film with the unmetallized surface of the later being exposed. The new laminated film drawn out from the position 4 is then subjected to the subsequent metallizing process which may be similar to "B" in FIG. 1, whereby a laminated film consisting of a film which is metallized at both sides and a base film is obtained.

In the above described procedure, the base film is employed for reinforcing the film to be treated, during the second metallizing process, as well as in the first metallizing process. However, when the film to be treated is of enough thickness, say thicker than 10 microns, it is possible to omit the use of the base film in the second metallizing process. In this case, the film which has already been metallized at one side during the first metallizing process is subjected to the second metallizing process solely, i.e., without being backed by the base film. It does not affect the product materially to omit the use of the base film when the film to be treated is thick enough, becuase the film which has experienced the heat treatment during the first metallizing process is less likely to be distorted during the second metalling process. It is also possible to employ another base member such as polymeric material other than used in the first metallizing process or a metal foil, in place of the base film used in the first metallizing process.

In general, the film metallized at one or both sides in accordance with the present invention is put to the actual use upon being delaminated from the base film. In this regards, it is possible to cut the film into pieces, to process, and to transport in the form of laminated film so as to protect the film until it is actually used.

It will be understood from the foregoing description, that the method of the present invention provides a readiness for adopting the vacuum evaporation to extremely thin films, wherein the film to be treated is kept in close contact with the base film without the wrinkles, and wherein those two films are hardly be delaminated from each other when they expand or shrink due to the change of the temperature.

The film metallized by the vacuum evaporation incorporating the method of the present invention may be used independently of the base film, i.e., upon being peeled off from the base film. It is also possible to use the film in the laminated state with the base film, as a dielectric of a capacitor.

Two practical embodiments are shown below, which are intended merely to have the present invention be understood more fully and not to limit the scope of the invention to these embodiments.

THE FIRST EMBODIMENT

A first unelongated film of 95 microns in thickness and a second unelongated film of 160 microns in thickness were stacked one on the other. The two films were made of a polyvinylidene fluoride polymer, the intrinsic viscosity of which (3 i n h) being 1.10 in the state of dimethyl formamide solution, measured at 30°C.

The unelongated and thus laminated film, consisting of those first and second films, was then elongated in the machine direction at a rate of 12 m/min, and at 150°C, until it reaches 2.8 times as long as the unelongated state. Then, thus uniaxially elongated laminated film was elongated in cross direction by a tenter, at 160°C until it reaches 5.8 times as large as the original dimention, and then was subjected to a heat treatment at 173°C. As a result of this biaxial elongation, a laminated film was obtained consisting of a first film of 6 microns and a second film of 9 microns. The first and the second films were at this stage seemingly adhered to each other, but could be easily peeled off from each other if one would try so. The coefficients of thermal shrinking of two films were deemed to be equal within the range of possible error, and the experiment showed that there never occurs any delamination or separation when the laminated film was allowed to make a free shrinking by 3% in the machine direction and 2% in the cross direction at 140°C. The first film of 6 microns in thickness and of 500 mm in width was then treated in the aforesaid manner so as to be formed at each surface thereof an aluminium layer having surface resistance of 1.2 $\Omega/cm^2$, which could be directly used as a dielectric of a capacitor. Experiment showed that there appeared no wrinkles in this metallized film which would contaminate the final products.

THE SECOND EMBODIMENT

A first unelongated film of polyvinylidene fluoride polymer, whose instrinsic viscosity (7 i n h) being 1.0 and whose thickness is 20 microns, was prepared. As a second film, another unelongated film was prepared which was made of the same polymer polyblended with 5% of polymethyl methacrylate, commercially available as ACRYPET "M" produced by Mitsubishi Rayon. The second film of 52 microns in thickness was molded from thus polyblonded polymer.

Those two films are laminated with each other, and then subjected to an uniaxial elongation in the machine direction at 90°C and at a rate of 15m/min, until its length reaches 4.8 times as long as unelongated length, whereby a laminated film of 30 microns intotal thickness consisting of a polyvinylidene fluoride film of 4 microns and a base film of 26 microns was obtained.

The co-efficients of the dry thermal shrinking at 100°C were observed to be 12% in the machine direction and 0% in the cross direction.

The first elongated film of 4 microns in thickness was then treated by vacuum evaporation incorporating the aforesaid procedure so as to be formed at each side thereof an aluminium layer having surface resistance of $3.5\Omega/cm^2$, and then peeled off from the base film. It was confirmed that according to the present invention extremely thin film of 4 microns which is of polyvinylidene fluoride, can be safely and commercially metallized at its both sides, which metallization was quite difficult by the convventional vacuum evaporation method.

It is to be appreciated that extremely thin metallized films which can be successfully manufactured by the method of the present invention have many uses, for example it can be used as a piezoelectric film to be incorporated in sound-electro transducer, electromechanical transducer, or in pressure sensing element, or as a dielectric to be incorporated organic film condenser.

As many apparently widely different embodiments of this invention may be made without departing from the spirit and scope thereof, it is to be understood that the invention is not limited to the specific embodiments thereof except as defined in the appended claims.

What is claimed is:

1. A method for effecting vacuum evaporation onto both surfaces of a film comprising forming a laminated film consisting of a first film to be treated and a second film which serves as a base film and being of a thickness at least equal to that of the first film, said first and said second films being not subjected to elongation prior to the lamination, elongating the laminated film at least uniaxially at a temperature below the melting points of the materials of the two films and above the second order transition points of the two materials, subjecting thus elongated laminated film to a vacuum evaoporation process so as to effect a vacuum evaporation to the first film at one surface thereof, winding the laminated film having its first film having been treated into a roll, peeling off the first film from the second film at the outermost of the roll and unwind one of them around the roll, forming a new laminated film by putting the unwound film onto the other film in such a manner that the first film contacts the second film at its treated surface with the other surface being exposed, and subjecting the new laminated film to vacuum evaporation to treat the first film at said other surface.

* * * * *